United States Patent [19]

Gage

[11] 4,447,000
[45] May 8, 1984

[54] TURNOVER MECHANISM

[75] Inventor: Clifford H. Gage, Fort Edward, N.Y.

[73] Assignee: Annette Kowalczyk, Staten Island, N.Y.

[21] Appl. No.: 317,239

[22] Filed: Nov. 2, 1981

[51] Int. Cl.³ .............................................. B27F 7/02
[52] U.S. Cl. .................................... 227/49; 198/403; 414/765; 227/109; 227/118
[58] Field of Search ............... 198/379, 402, 403, 412; 227/49, 99, 109, 118, 149, 151; 414/763, 764, 765, 766, 762

[56] References Cited

U.S. PATENT DOCUMENTS

| | | | |
|---|---|---|---|
| 1,058,894 | 4/1913 | Northrup | 227/49 |
| 1,110,073 | 9/1914 | Miller | 227/49 |
| 1,401,767 | 12/1921 | Finch | 227/118 |
| 2,154,476 | 4/1939 | Simpson et al. | 198/403 X |
| 2,506,087 | 5/1950 | Kadell | 198/403 X |
| 2,881,899 | 4/1959 | Rasmussen | 414/765 X |
| 3,247,963 | 4/1966 | Fehely | 198/403 X |
| 3,273,776 | 9/1966 | Bryson | 227/109 |
| 3,514,028 | 5/1970 | Kowalczyk | 227/99 |

*Primary Examiner*—Paul A. Bell
*Attorney, Agent, or Firm*—Karl L. Spivak

[57] ABSTRACT

A turnover mechanism for turning a planar strip through one hundred and eighty degrees is disclosed. The turnover mechanism is particularly useful in the manufacture of tackless strips and is adopted for installation in a tackless strip manufacturing machine. The turnover mechanism includes a ratchet which is activated by the usual pin driving mechanism to rotate a turner in timed sequence with the pin inserting operations. The turner includes a groove and the turnover mechanism incorporates a cam to urge one end of each strip into the groove after the pins are properly seated in the strip. The turner turns over or flips each pinned strip in sequence to permit the tackless strip manufacturing machine to automatically apply a plurality of floor attaching nails in each strip in a direction opposite to the orientation of the pins.

13 Claims, 3 Drawing Figures

TURNOVER MECHANISM

BACKGROUND OF THE INVENTION

The present invention relates generally to the field of tackless strips of the type useful to hold wall to wall carpets in place, and more particularly, is directed to an automatic machine for the manufacture of tackless strips.

Tackless strips or pin boards are usually about ¼ inch in thickness, about 1 1/10 inches wide and 48 inches long. The tackless strips contain a plurality of similarly inclined pins which project upwardly to engage the peripheral undersurface of the carpet and a plurality of downwardly projecting nails for attaching the strips to the floor. Many manual operations were required to fabricate such tackless strips and prior workers have long sought to automate the manufacturing process. One successful apparatus is disclosed in U.S. Pat. No. 3,514,028, which patent is owned by the assignee of the present application.

The prior patented apparatus incorporated a first nailing station wherein a plurality of small sharp pins were angularly applied to one surface of the strip or board. An endless belt was employed to transport each strip with the pins applied to a second nailing station wherein a plurality of the downwardly projecting nails were driven through the board in transversely spaced intervals in a direction opposite to the direction of the pins. Intermediate the first and second nailing stations was provided a strip turnover means which functioned to turn over the strip through one hundred and eighty degrees between the first nailing station and the second nailing station whereby the pins could be driven into one flat surface of the board and the nails could be inserted through the second flat surface of the board.

The prior art turnover means was and is a constant source of operational difficulties whereby slight defects in the wood, such as warping or slight misalignment of the strips during transportation was often sufficient to prevent proper turnover function, which could result in a defective pin strip, or worse, in a jammed machine. The present invention seeks to overcome the turnover problems inherent in the existing automatic pin board manufacturing machines by providing a positive, reliable turnover mechanism which is capable of continuous trouble free operation and which is compatible for use with existing automatic tackless strip manufacturing machines.

SUMMARY OF THE INVENTION

The present invention relates generally to the field of pin board or tackless strip manufacture, and more particularly, is directed to a novel turnover mechanism that is designed to automatically and positively turn over each strip of wood as the strip is conveyed between the first, pin affixing station and the second, nail driving station.

The turnover mechanism of the present invention is particularly designed to function with an automatic apparatus for manufacture of pin boards and is arranged to turn over each strip in timed sequence as the strips are fed by a continuously moving conveyor. The turnover mechanism comprises geared indexing means responsive to the function of the pin driving operation and includes endward means to engage one end of each strip in sequence for strip turnover purposes.

It is therefore an object of the present invention to provide an improved turnover mechanism of the type set forth.

It is another object of the present invention to provide a novel turnover mechanism that includes means timed with the sequence of a tackless strip machine operation to positively engage and to sequentially turn over each strip as the strip is transported from a first nailing station to a second nailing station.

It is another object of the present invention to provide a novel turnover mechanism comprising indexing means to synchronize the rate of turnover with the speed of operation of an associated nailing machine and means to urge each strip in sequence into the end slot of a turner.

It is another object of the present invention to provide a novel turnover mechanism comprising reliable, positive, strip end engaging means and gear means to rotate the strip as the strip is advanced from a first nailing station to a second nailing station.

It is another object of the present invention to provide a novel turnover mechanism that is rugged in construction, simple in design and trouble free when in use.

Other objects and a fuller understanding of the invention will be had by referring to the following description and claims of a preferred embodiment, taken in conjunction with the accompanying drawings, wherein like reference characters refer to similar parts throughout the several views.

DESCRIPTION OF THE PREFERRED EMBODIMENT OF THE INVENTION

Figure 1:
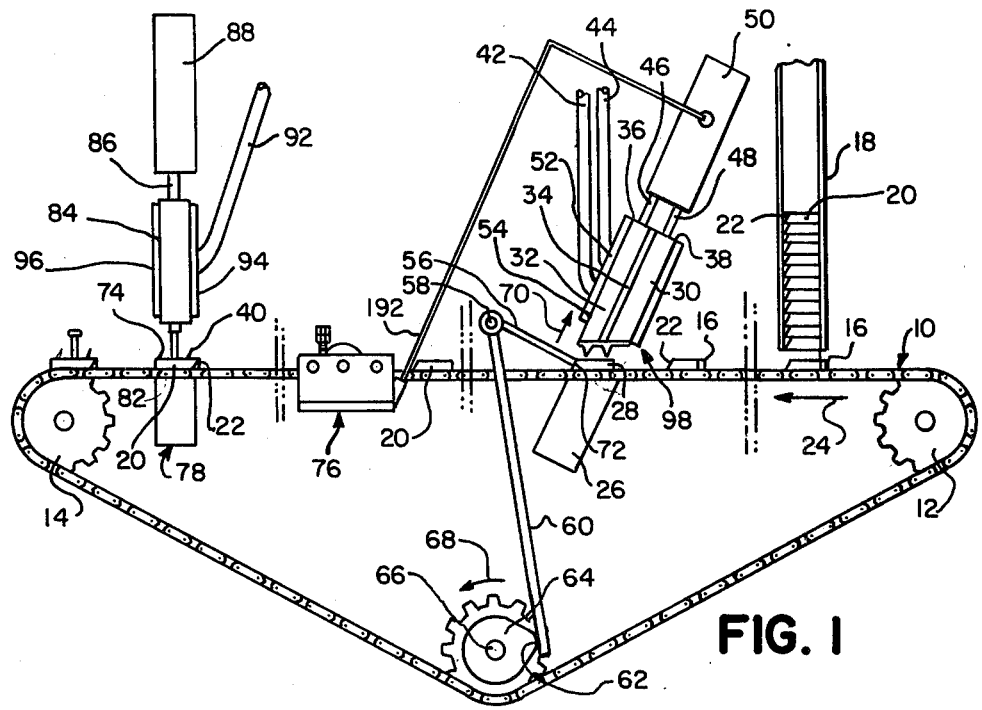
FIG. 1 is a diagrammatic, side elevational view of a pin strip manufacturing apparatus of known design equipped with the turnover mechanism of the present invention.

Although specific terms are used in the following description for the sake of clarity, these terms are intended to refer only to the particular structure of the invention selected for illustration in the drawings, and are not intended to define or limit the scope of the invention.

Referring now to the drawings, as seen in FIG. 1, an endless conveyor 10 operates between end sprockets 12 and 14. At intervals somewhat greater than the width of a strip, ribs 16 are attached to links of the endless chain for engaging and transporting individual wood strips or boards. At the entrance of the mechanism is positioned a vertical hopper 18 which is adapted to hold a stack of strips or boards 20, the front faces 22 of which are preferably beveled. The ribs 16 engage the lowermost strip 20 in the hopper 18 as the conveyor moves to the left as indicated by the arrow 24 to transport each strip or board 20 sequentially to the first pin driving station 98. The first nailing or pin driving station 98 includes a support 26 having a plate 28 affixed thereon and is adapted to drive or otherwise insert the points of a plurality of pins 40 into each strip 20 with their heads flush with the upper surface of the strip.

Still referring to FIG. 1, there are provided hollow members 30 and 32 which are open centrally and are held apart by a spacer 34. The hollow members are transversely positioned across the machine and covers 36 and 38 are provided to form a complete unit. Known means are provided for feeding the pins 40 into the hollow members 30 and 32 in aligned orientation and punches 46 and 48 are operated by a ram or reciprocator 50 which extends across the length of the strips. The tubes 42 and 44 have pins 40 therein fed from a conventional nail hopper (not shown), all of the said pins having their points or tips facing downwardly. The pins enter the unit through the openings 52 and 54 and are positioned so that the operation of the ram 50 will simultaneously engage a complete set of pins over the entire width of the strip 20 and drive the pins into and through each board 20 until the pin heads are flush with the top of the board.

In order to hold the strips firmly in place through the first pin driving operation, there is provided a plate 56 which is pivoted at 58 and which is employed as a backstop. A lever 60 is secured in fixed relation to plate 56 and has its free end in contact with the lobe 62 to constitute a cam follower. The lobe 62 is mounted on the disc 64 which is rotatable on the shaft 66 and operated by means (not shown) in the direction of the arrow 68 to cause the plate 56 to alternately move in the direction of the arrow 70 to sequentially raise the end 72 thereof above the face 22 of each board 20.

The strips or boards 20 with the plurality of driven pins 40 having their pointed ends 74 projecting downwardly are carried by the conveyor 10 to the second station or turnover mechanism 76. The turnover mechanism 76 functions in timed sequence to receive and turn over through one hundred and eighty degrees each pinned strip 20 so that the pointed ends 74 of the plurality of pins all point upwardly upon leaving the station 76. Each of the strips 20 is then carried by the conveyor 10 to the third station 78 for application of a plurality of conventional floor attaching nails (not shown) in a direction opposite to the orientation of the pins 40, for floor attaching purposes. The floor nail application station 78 functions in known manner to affix a plurality of nails into each tackless strip 20 and comprises generally an anvil 82 above which are mounted a plurality of transversely spaced hollow members 84 within which the nail punches 86 are vertically reciprocal. An upper transverse ram 88 is functioned in timed sequence by the machine to drive the nail punches 86 downwardly to pierce the boards 20 with the pointed ends of the nails in the known manner. The nails are fed into the tubes 92 with their respective pointed ends facing downwardly to position each nail in vertical alignment below a punch 86. The lower ends of the tubes 92 communicate with openings into the hollow cylindrical members 84 for this purpose. In known manner, covers 94, 96 are provided for the cylinders 84 for nail alignment purposes.

Figure 3:
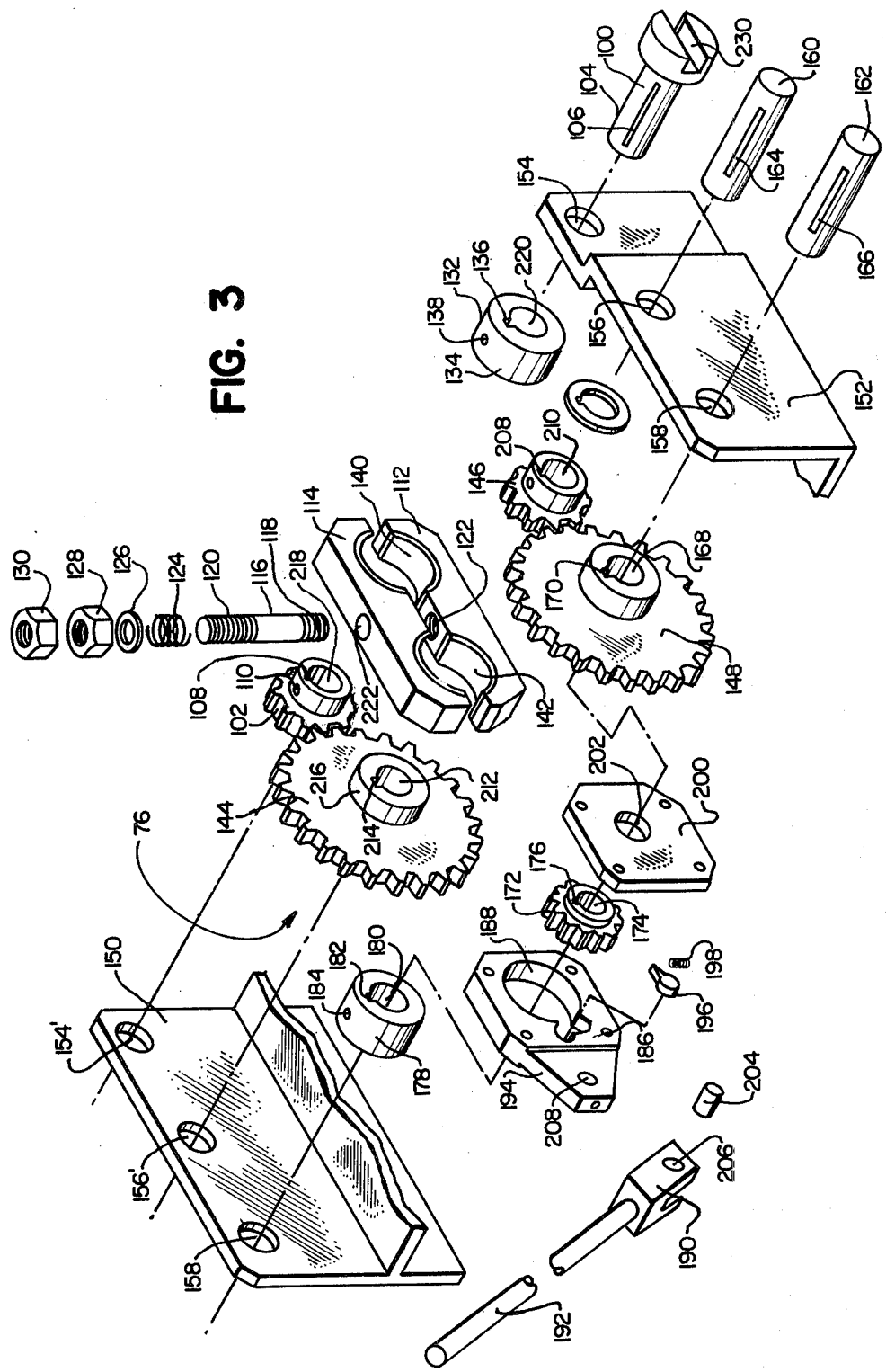
FIG. 3 is an enlarged, exploded, perspective view of the turnover mechanism.

Referring now to FIGS. 1 and 3, the second station or turnover mechanism 76 is illustrated in operative interconnection with the ram 50 through a connecting rod 192 whereby each reciprocation of the ram 50 will cause simultaneous and coincidental reciprocation of the operating rod 192. A clevis 190 is bottomly affixed to the operating rod 192 and is pivotly connected to the extending arm 194 of the ratchet housing 186 by a conventional pivot pin 204, which pin is positioned through the aligned clevis and arm openings 206, 208. Accordingly, upon each reciprocation of the operating rod 192, the ratchet housing 186 will be caused to circularly reciprocate.

The turnover mechansim 76 comprises a pair of spaced housing covers 150, 152 which are provided with respective pairs of aligned openings 154, 154', 156, 156' and 158, 158'. An indexing shaft 162 is rotatable within the aligned housing cover openings 158, 158' in one direction only in response to the circular reciprocation of the ratchet housing 186. As illustrated, a cylindrical spacer 178, a ratchet gear 172 and a large diameter gear 148 are respectively secured to the ratchet shaft 162 at their aligned, respective openings 180, 174 and 168. Each of the aligned openings includes a respective keyway 182, 176 and 170, which keyways conventionally receive the ratchet key 166 for interlocking, simultaneous rotation. The spacer 178 is rotatively secured within the central opening 188 provided in the ratchet housing 186 in a frictional, sliding engagement.

A pawl 196 is rotatively secured on the housing 186 and is urged by its spring 198 in known manner to engage the teeth of the ratchet gear 172. As the ratchet housing 186 is reciprocated in a first rotative direction by the operating rod 192, the pawl 196 functions to ride over the teeth of the ratchet gear 172. Accordingly, as the ratchet housing 186 is reciprocated in a first rotative direction by the operating rod 192, the pawl 196 functions to ride over the teeth of the ratchet gear 172 to thereby cause no rotation of the indexing shaft 162. Upon circular reciprocation of the ratchet housing 186 in the opposite direction, the pawl 196 will be urged by its spring 198 in well known manner to engage a tooth of the ratchet gear 172 to thus cause simultaneous rotation of the keyway affixed shaft 162 and consequently the affixed large spur gear 148. With the pawl 196 thus engaged with a tooth of the ratchet gear 172, the ratchet housing 186 will cause indexing of the gears 172, 148 in a single rotative direction. If desired, a block 200 having a bearing opening 202 may be provided for support purposes in known manner.

Referring particularly to FIG. 3, it will be noted that the large spur gear 148 meshes with a small spur gear 146 to cause rotation thereof. As illustrated, a second shaft 160 is rotative within the aligned openings 156, 156' and includes a key 164. Rotation of the small spur gear 146 causes rotation of the shaft 160 by interaction of the key 164 within the gear keyway 208. As illustrated, the shaft 160 is positioned through the central opening 210 of the small spur gear 146 and the aligned opening 212 of the large reversing gear 144. The reversing gear opening 212 includes a keyway 214 which conventionally receives the shaft key 164 to tie in rotation of the reversing gear 144 with the rotation of the small spur gear 146 in usual manner. The reversing gear 144 includes an integral boss 216 which is positioned to frictionally ride within the brake opening 142 for braking purposes, as hereinafter more fully set forth.

The reversing gear 144 meshes with the second small spur gear 102 to cause simultaneous and opposite rotation thereof. As illustrated, the second small spur gear 102 and the braking cylinder 134 are secured on the shaft 104 of the turner 100 and include aligned openings 218, 220 and aligned keyways 108, 136 for securing to the turner key 106 in known manner. Set screws 184, 110 and 138 may be applied in well known manner to secure the various elements upon the respective shafts. The brake cylinder 134 is positioned in frictional engagement within the brake opening 140 to prevent overrunning of the turner 100 and to help prevent the ratchet gear 172 from possibly operating in reverse. A threaded stud 116 inserts through the aligned openings 222, 122 provided in the vertically aligned brake members 112, 114, to provide frictional braking engagement between the respective brake openings 140, 142, the braking cylinder 134 and the braking boss 216. The stud 116 includes a threaded bottom section 118 which is threadedly engaged within the threaded opening 122. A spring 124 and washer 126 overfit the stud body 116 to apply spring bias against the upper brake member 114 when the threaded nuts 128, 130 are threadedly engaged on the upper threaded section 120 of the stud 116. See FIG. 2.

In operation, the connecting rod 192 is reciprocated by the reciprocation of the ram 50 during each pin driving sequence. The interaction of the clevis 190 and the ratchet housing arm 194 causes simultaneous rotary reciprocation of the ratchet housing 186. The pawl 196, under urging of its spring 198, engages the teeth of the ratchet gear 172, in one direction only and slips in the other direction, to cause stepped rotation of the shaft 162. The gear 172 is sized to rotate through forty-five degrees upon movement of the operating rod 192 in a first direction. Upon reciprocation of the rod in its second direction, the pawl 196 will slip relative to the teeth of the ratchet gear 172 and thereby cause no rotation of the ratchet gear 172. Rotation of the ratchet gear 172 through forty-five degrees causes simultaneous rotation of the large spur gear 148 inasmuch as both of the gears 172, 148 are secured upon the same shaft 162. The first small spur gear 146 is fabricated with one-half the number of the teeth as the large spur gear 148 and accordingly, when the large gear 148 is rotated through forty-five degrees, the inter-meshing of the gears will cause the small spur gear 146 to rotate through twice the angle or ninety degrees.

Rotation of the small gear 146 causes simultaneous rotation of is pinned shaft 160 and accordingly ninety degree rotation of the large, reversing gear 144 which is also secured on the shaft 160. The second small spur gear 102 is fabricated with one half the number of teeth as the reversing gear 144, and is in mesh therewith. Accordingly, when the reversing gear 144 is turned through ninety degrees upon ninety degree rotation of the first small spur gear 146, the second small spur gear will rotate through an angle that is twice as large, or one hundred and eighty degrees. One hundred and eighty degree rotation of the second small spur gear 102 causes simultaneous one hundred and eighty degree rotation of the turner 100 through interaction of the gear keyway 108 with the turner key 106. Therefore, for each forty-five degree rotation at the ratchet gear 172, a one-hundred and eighty degree rotation of the turner 100 will occur in timed, indexed sequence.

Figure 2:
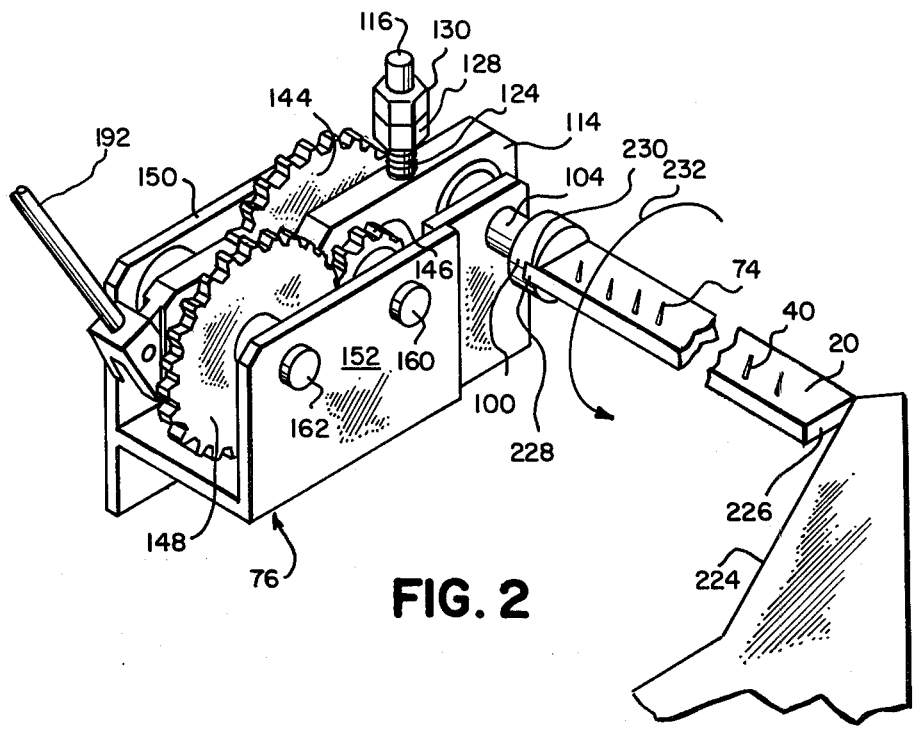
FIG. 2 is an enlarged, partial, perspective view of the turnover apparatus.

Referring now to FIGS. 1 and 2, it will be seen that the endless conveyor 10 functions to move each strip or board 20 in turn from the first nailing station 98 to the second station which comprises the turnover mechanism 76. A cam 224 or other suitable mechanism is positioned to engage the outermost end 226 of each board 20 to urge the inward end 228 of each board or strip into the slot 230 provided in the turner 100 in a positive interconnection. The engagement of the inward end 228 of the strip 20 within the turner slot 230 insures positive strip turnover through one hundred and eighty degrees as indicated by the arrow 232 upon each one hundred and eighty degree rotation of the turner 100. The positive interconnection between the strip end 228 within the slot 230 assures strip turnover even though the strip may be warped or otherwise defective.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A turnover mechanism to turn over elongated strips for use in an automatic strip nailing machine of the type comprising a reciprocating ram to drive the nails into each strip in sequential operation and a conveyor to transport the strips to the mechanism, comprising the combination of arm means connected to the ram for reciprocation to provide a linear, reciprocating power input upon each reciprocation of the ram;

ratchet means rotated by the arm means to convert the linear power input into uni-directional, rotary output, the ratchet means being rotated through a first arc of rotation upon each reciprocation of the arm means;

a strip turner positioned above the conveyor to engage a first end of each strip as the strip is transported by the conveyor; gear means rotated by the rotary output to rotate the strip turner, the gear means being adapted to rotate the turner through a second arc of rotation that is greater than the first arc of rotation, the strip turner being provided with means to engage the first end portion of each strip to turn over the strip as the turner is rotated;

whereby the strip turner engages and turns over each strip in turn after the nails are driven by the ram.

2. The turnover mechanism of claim 1 wherein the ratchet means comprises a ratchet housing connected for reciprocal rotation by the arm means, a ratchet gear rotatable relative to the ratchet housing and a detent means intermediate the ratchet housing and the ratchet gear to provide uni-directional rotation of the ratchet gear.

3. The turnover mechanism of claim 2 wherein the detent means comprises a spring loaded pawl, the pawl being adapted to engage the ratchet gear when the ratchet housing reciprocates in a first direction and not to engage the ratchet gear when the ratchet housing reciprocates in an opposite, second direction.

4. The turnover mechanism of claim 1 wherein the means to engage includes an endwardly open slot, the slot being adapted to engage in turn the first end portion of each strip as the strip is carried to the turnover mechanism by the conveyor.

5. The turnover mechanism of claim 4 and brake means associated with the gear means to frictionally restrain the rotation of the gear means.

6. The turnover mechanism of claim 5 wherein the brake means comprises brake friction adjusting means to vary the frictional forces generated by the brake means.

7. The turnover mechanism of claim 5 and cam means spaced from the turner the cam means being adapted to urge an end portion of each strip into the slot for engagement with the turner.

8. The turnover mechanism of claim 7 wherein the said cam means comprises a cam spaced from the strip turner, the cam being positioned to engage a second end portion of each strip to urge each strip toward the strip turner.

9. The turnover mechanism of claim 7 wherein the second arc of rotation is four times as great as the first arc of rotation.

10. The turnover mechanism of claim 9 wherein the gear means comprises at least two pairs of step up gears.

11. The turnover mechanism of claim 9 wherein the gear means comprises a ratchet gear first and second pairs of gears mounted on three shafts, each of the pairs of gears comprising a large diameter gear and a small diameter gear.

12. The turnover mechanism of claim 11 wherein the first large diameter gear and the ratchet gear are affixed to a first shaft, the first small diameter gear and the second large diameter gear are affixed to a second shaft and the second small diameter gear and the strip turner are affixed to the third shaft.

13. The turnover mechanism of claim 12 wherein the large diameter gears contain twice as many teeth as the small diameter gears whereby one of the small diameter gears rotates through four times the rotative distance as the arc of rotation of the ratchet gear.

* * * * *